May 20, 1958 J. L. RENNICK 2,835,727

APPARATUS FOR REPRODUCING IMAGES IN NATURAL COLOR

Filed May 14, 1951 2 Sheets-Sheet 1

INVENTOR.
JOHN L. RENNICK
BY Francis W. Crotty
HIS ATTORNEY

APPARATUS FOR REPRODUCING IMAGES IN NATURAL COLOR

Filed May 14, 1951 2 Sheets-Sheet 2

INVENTOR.
JOHN L. RENNICK
BY Francis W. Crotty
HIS ATTORNEY 2,835,727

APPARATUS FOR REPRODUCING IMAGES IN NATURAL COLOR

John L. Rennick, Elmwood Park, Ill., assignor to Zenith Radio Corporation, a corporation of Illinois Application May 14, 1951, Serial No. 226,125

3 Claims. (Cl. 178—5.4)

This invention relates to television reception and more particularly to a novel method and apparatus for reproducing images in natural color. The invention is especially suited for utilizing information of the type produced and transmitted in the color television system disclosed in the copending application of John L. Rennick, Serial No. 215,761, filed March 15, 1951, and assigned to the present assignee. For convenience, the invention will be described in that connection.

Picture information radiated by a transmitter such as the one disclosed in the aforementioned Rennick application defines a scanned subject in terms of two distinct characteristics, namely, brightness and color. The brightness information is derived by additively combining the output signals from three cameras, each adapted to produce a video signal representing one of the three primary colors of the scanned subject. The resulting video signal is entirely free of color information and is generally similar to that of a conventional black-and-white system.

The color content of the scanned subject is prescribed by a plurality of control signals, each representing the amplitude difference between one of the three primary color signals and one-third the brightness video signal. These control signals are devoid of brightness information and, because of the manner of their generation, they add to zero at every instant of time. Consequently, only two of the control signals need be utilized at the receiver in order completely to define hue and color saturation in the reproduced image.

The afore-mentioned application describes in detail a receiver for reproducing color images by the use of three picture tubes and recognizes that one three-color tube may be utilized. Such a tube may include an electrode system for developing a single beam of electrons and a fluorescent screen having a plurality of triangularly shaped clusters of three fluorescent elements, each emitting light of one of the primary colors in response to electron bombardment. The advantages of a system employing a single picture tube over those in which three picture tubes are required are self-evident.

It is an object of this invention to provide a novel method of and apparatus for reproducing television images in natural color in an improved system using a single picture tube.

In accordance with the invention, there is provided a television receiver for synthesizing an image in natural color in response to the afore-described video and control signals. The receiver comprises an image-reproducing device including a single electrode system for developing a single beam of electrons and a fluorescent screen having a multiplicity of triangularly shaped clusters of three fluorescent elements. Each of these elements emits light of one of the three primary colors in response to electron bombardment. A deflection system is provided for controlling the position of the beam with respect to the target, and means are included for applying sweep signals to the deflection system to effect scanning of the target by the beam. In order to modulate the beam as it scans the target, the system includes means for applying the brightness signal to the electrode system. The receiver further includes means for concurrently applying modified control signals having respective amplitudes inversely proportional to that of the brightness signal to the deflection system to effect angular and radial displacement of the beam relative to a reference position in each of the clusters to determine the color contribution of each such cluster to an image in natural color.

The features which are believed to be novel are set forth with particularity in the appended claims and the invention, both as to its organization and manner of operation, together with further objects and advantages thereof may best be understood by reference to the following description taken in connection with the accompanying drawings in which:

Figures 1, 2, 3:
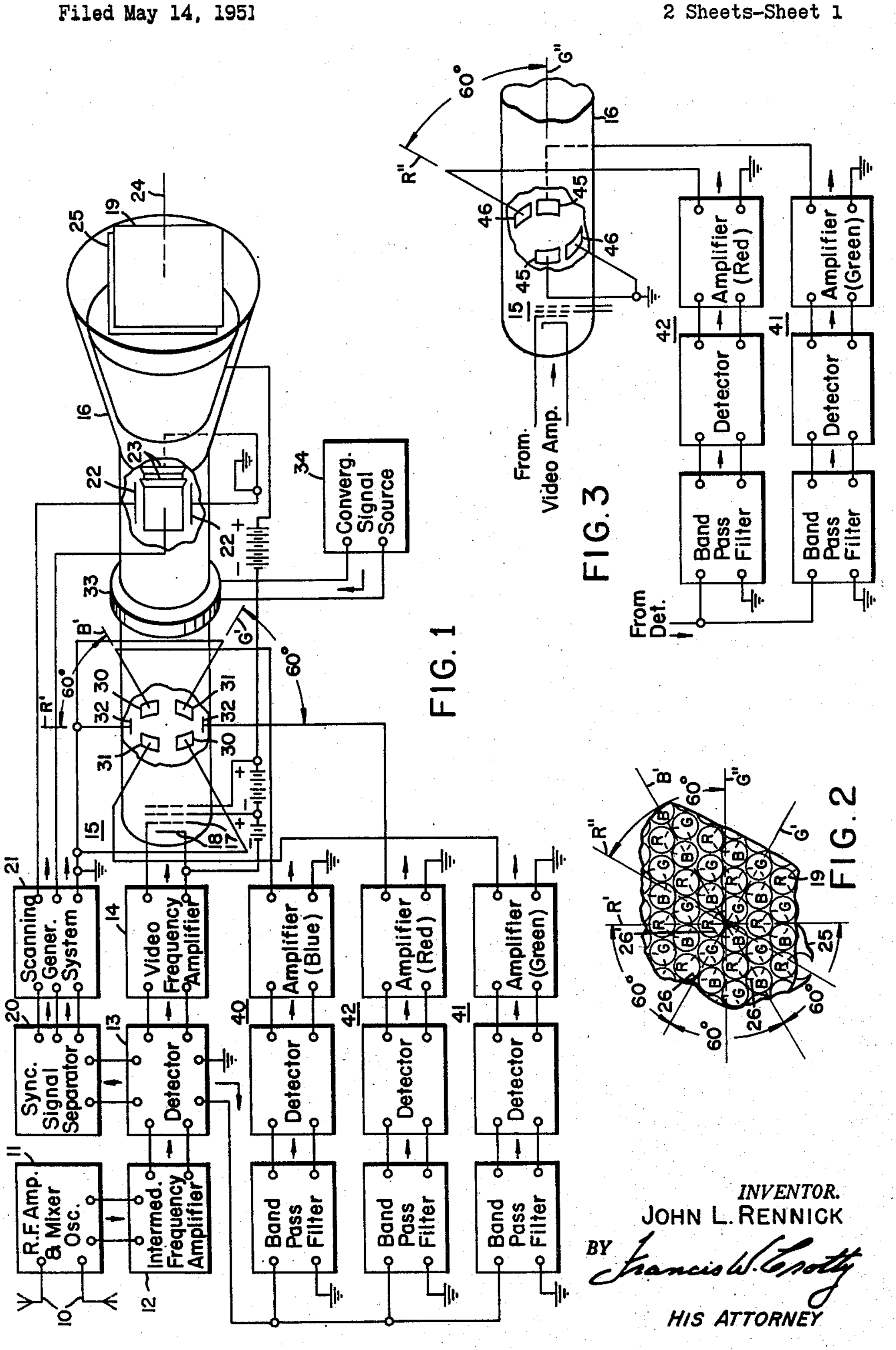
Figure 1 is a block diagram, partly schematic, of a complete television receiver for reproducing images in natural color according to the teachings of the present invention.
Figure 2 represents a segment of the target electrode of the arrangement of Figure 1 drawn to en enlarged scale.
Figure 3 is a block diagram, partly schematic, of a modified arrangement of the receiver shown in Figure 1.

With reference now to Figure 1, the color television receiver there represented includes an antenna circuit 10 coupled to a radio-frequency amplifier and mixer-oscillator stage 11. Unit 11 is coupled in cascade with an intermediate-frequency amplifier 12 of one or more stages, a picture or second detector 13 and a video-frequency amplifier 14 of any desired number of stages. The output circuit of amplifier 14 is connected to an electron-beam-forming electrode system 15 of an image-reproducing device 16 of the cathode-ray type which is shown partially broken away to reveal deflection elements contained therein. Specifically, amplifier 14 is coupled to the control electrode 17 and cathode 18 of electrode system 15 which additionally includes the usual focusing and accelerating electrodes for directing a beam of electrons upon a fluorescent target screen 19 to be described more fully hereinafter.

Detector 13 is coupled to a synchronizing-signal separator 20 which separates the line and frame synchronizing signal components and supplies them to individual output circuits coupled with a scanning generator system 21. Generator 21 is of the type which produces the usual form of saw-tooth frame and line scanning signals in each of two output circuits connected to frame deflection plates 22 and line deflection plates 23 of tube 16.

The circuit as thus far described is generally similar to a conventional superheterodyne type of television receiver and stages 11—14, 20 and 21 may be of any known construction. In operation, a radiated signal is intercepted by antenna 10 and applied to stage 11 where, after appropriate selection and amplification, it is converted to the intermediate frequency of the receiver. The intermediate-frequency signal is amplified in stage 12 and supplied to detector 13, wherein the video and synchronizing signal components are derived. The video-frequency components are amplified by amplifier 14 and applied to electrode system 15 of image tube 16 to control the intensity of the electron beam thereof. At the same time, separator 20 separates the line and frame synchronizing signals of the received signal individually to synchronize the line and frame signal generating sections of stage 21. Thus, the beam from electrode system 15 is deflected in synchronism with the synchronizing-signal components of the received signal to trace a rectangular raster, or a series of interlaced fields of spaced parallel lines, upon screen 19 of image tube 16 as the beam intensity is varied in response to the video-frequency components thereby to develop the light and shade values of an image on the viewing screen.

In order to reproduce images in natural color, target 19 is comprised of a multiplicity of triangularly shaped clusters of three fluorescent disc-shaped elements. These elements individually emit light of one of the primary colors in response to electron bombardment. More specifically, the fluorescent elements are of like area, substantially fill the screen surface, and are arrayed so that the electron beam "sees" a succession of identically oriented clusters along each line trace of the scanning pattern. The several fluorescent elements are designated "R," "G" and "B" in Figure 2 which represents an enlarged section of screen 19 in the vicinity of the longitudinal axis 24 of tube 16 and which is illustrative of the distribution of fluorescent elements over the entire screen. A planar parallax member 25 is disposed behind, or on the electron gun side of, screen 19 and is provided with a plurality of openings 26 shown in dash outline in Figure 2. There is one opening for each triangular cluster of screen 19 and each of the openings is centered with respect to the electron beam path from gun 15 to the central portion of its associated cluster. The openings have areas which correspond to that of the individual fluorescent elements and in Figure 2 their outlines identify the several clusters.

The beam of electrons from electrode system 15, in one operating condition of scanning, passes through successive ones of the openings 26 in approximately perpendicular relation with respect to parallax member 25 to impinge upon reference positions centrally disposed relative to each of the several fluorescent clusters. Since each of the three fluorescent elements of every cluster is equally excited in this mode of operation, the resulting light is of a white quality.

In order to alter the color contribution of each fluorescent element to the light produced by its cluster, it is necessary to shift the angle of incidence of the electron beam wtih respect to the plane of parallax member 25. To that end, an auxiliary deflection system including a plurality of deflection elements 30, 31 and 32 is disposed within the neck of tube 16 to provide, in the presence of input signals, a deflection of the beam of electrons from gun 15 transversely of axis 24. Elements 30—32 are illustrated as pairs of deflecting plates, the axes of which are equi-angularly displaced about tube axis 24 so that the individual deflecting-field components of these plates are displaced about that axis. It is to be understood that although deflection plates have been shown, any equivalent arrangement may be employed, for example, magnetic deflection coils.

Each of the plates 30—32 may be defined as a blue, green or red deflection element since the orientation of the plates is such that upon the application of a signal to any one of the elements alone, the beam of electrons is deflected along a line extending from the center of one of the triangularly shaped clusters centrally through one of the fluorescent elements R, G or B as the case may be. The deflection axes of the deflection elements 30—32 are identified as B', G' and R', respectively, in Figures 1 and 2. The elements 30—32 deflect the beam away from the axis 24 and in order to cause the beam to return to the axis so that it may project through the openings 26 in member 25, a convergence coil 33, coupled to a suitable convergence signal source 34, is disposed about the neck of tube 16 between plates 30—32 and plates 23 and 22.

It will be assumed that the receiver under consideration is to utilize the signal radiated by the transmitter of the afore-mentioned copending application which contains, in addition to a 4 mcs. video band, color control signals of lesser bandwidth, modulated upon different subcarriers interlaced in the video-frequency spectrum. That is to say, the color information is transmitted in interleaving relation with the brightness information so that the required bandwidth is but 4 mcs. This type of band-conserving method is generally well known and need not be described in detail.

To derive these color control signals, detector 13 is coupled to three control signal channels 40, 41 and 42, individually including a band pass filter in cascade with a detector and an amplifier. Each filter is arranged to pass, without attenuation, that portion of the video spectrum wherein one color control signal is available so that each may be said to be assigned to one of the blue, green and red color control signals and each is coupled to an associated one of pairs of plates 30—32. The polarity of signals applied to the auxiliary deflection plates 30—32 is such that for signals of like sense the deflection of the beam due to the field produced by each of the pairs is in the same direction with respect to the center of one of the clusters of fluorescent elements. In other words, a signal of positive polarity with respect to ground from any of the channels 40—42 produces a deflection of the beam in a direction from the center of one of the clusters toward the fluorescent element of associated color. Thus channels 40—42 serve as the means for concurrently applying each of the color control signals to one of the deflection elements of the auxiliary deflection system 30—32 to effect angular and radial displacement of the beam relative to a reference position centrally of each cluster to determine the color contribution of each such cluster to an image in natural color.

In operation, as the beam from electrode system 15 scans over the multiplicity of triangularly shaped clusters of fluorescent elements it is modulated in intensity in accordance with the brightness signal as described hereinbefore. At the same time, under the control of the signals from channels 40—42, the beam is deflected angularly and radially relative to a central reference position in each cluster under the conjoint effect of the plurality of control signals. Thus, the color contribution of each cluster to an image in natural color is determined. Specifically, the plates 30—32 serve to establish a plurality of deflection fields in response to the color control signals and these individual deflection fields effectively combine to produce a resultant field which effects the angular and radial displacement of the beam from the center of a fluorescent cluster which is here referred to as a reference position.

It may be helpful in understanding the receiver to consider several specific examples of operation in connection with a particular fluorescent cluster, namely, the one aligned with opening 26' of parallax member 25, as shown in Figure 2. By definition, each of the three color control signals is equal to the corresponding camera signal minus one-third the brightness signal. Hence, for a color condition in which each of the three cameras contribute equally, that is to say, a black and white picture is to be transmitted, the color control signals are zero in magnitude and the electron beam is not deflected with respect to the central reference position in that cluster. Consequently, the beam passes through opening 26' of parallax member 25 and impinges upon equal portions of each element of the cluster. Since the three primary colors are produced with equal relative intensities, white light is reproduced.

Let it be assumed now that at some operating interval the picture information being transmitted contains only a pure red color. For that condition the ratios of the red, blue and green camera signals are 1:0:0 and the brightness signal has a related magnitude of 1. Utilizing the relationship expressed earlier, it may be shown that the red color control signal has a magnitude of plus two-thirds and the blue and green color control signals each have a magnitude of minus one-third. The resultant of the signals applied to the plates 30—32 and the field of element 33 deflects the beam upwardly so that it impinges only upon the fluorescent element which emits red light. For the case of a diluted or less saturated red, under the control of plates 30—32, the electron beam impinges upon the cluster at some intermediate position between the red element and the central reference position. The same analysis is applicable for each of the other primary colors.

Let it now be assumed that a saturated purple color is required. For this operating condition, the green camera has zero output and the blue and red cameras have equal output signals with the result that red, blue and green control signals are in the relationship of ⅓:⅓:−⅔. These color control signals cause the electron beam to strike the fluorescent cluster so that the red and blue elements are equally excited, whereas the green element is inactive and the required purple color is reproduced. For a less saturated purple, a portion of the green element is excited corresponding to the degree of dilution.

There is thus available a gamut of colors, limited only by the purity of the red, green and blue primaries, and of which the dilution by white light may be controlled. As the electron beam is scanned across the target and modulated in intensity to produce light and shade values, the color contribution of each cluster is varied in response to the color control signals as dictated by the color content of the image being scanned at the transmitter. Hence, an image is synthesized in natural color on viewing screen 19.

As pointed out earlier, any two of the color control signals may be employed to define collectively hue and saturation of the reproduced image. The modified arrangement of Figure 3 is adapted to accomplish this. A picture tube 16 generally similar to the one employed in the circuit of Figure 1 is utilized, but in place of the auxiliary deflection system 30—32 two pairs of deflecting plates 45 and 46 are associated with the tube. Pairs 45 and 46 are disposed so that in the presence of signals thereon the electron beam is deflected along a line parallel to one of the sides of each triangular cluster. More specifically, pair 45 is designated the "green" deflection element and has an axis G″ and pair 46 is designated the "red" deflection element and has an axis designated R″. As illustrated in Figure 2, the projections along axis 24 of the axes G″ and R″ intersect centrally of one of the fluorescent clusters. The disposition of the axes of the plates is such that the bisector of the acute angle formed by their projections intercepts the blue fluorescent element of the cluster. Channel 40 is omitted and each of channels 41 (green) and 42 (red) is connected to the associated one of the pairs of plates 45 and 46. Signals from these channels are applied with such polarity that for signals of like sense the deflection of the beam due to the field produced by each of the pairs is in the same direction with respect to the center of one of the clusters.

The operation of the modified arrangement is generally similar to that described in connection with the circuit of Figure 1. It may be shown that the color control signals from channels 41 and 42 completely define the position of the electron beam from electrode system 15 with respect to a reference position in each of the clusters. For example, let it be assumed that the picture information being transmitted contains a pure red color. As pointed out in connection with the discussion of this example for the circuit of Figure 1, the resulting red color control signal has a magnitude of plus two-thirds and the green color control has a magnitude of minus one-third. The resultant of these two signals in connection with the field of convergence element 33 deflects the beam upwardly so that it impinges only upon the fluorescent element which emits red light. By a like analysis, it may be shown that an entire gamut of colors of required dilution may be produced. Consequently, the two-color control system signal of Figure 3 may be employed for the synthesis of images in natural color.

The color control signals transmitted in accordance with the system of the aforementioned Rennick application may be defined as follows:

$$R_c=R_0-\frac{R_0+G_0+B_0}{3}=R_0-\frac{W}{3} \quad (a)$$

$$G_c=G_0-\frac{R_0+G_0+B_0}{3}=G_0-\frac{W}{3} \quad (b)$$

$$B_c=B_0-\frac{R_0+B_0+G_0}{3}=B_0-\frac{W}{3} \quad (c)$$

where $R_c$, $G_c$, and $B_c$ are the respective color control signals; $R_0$, $G_0$ and $B_0$ are the signals developed by the red, green and blue cameras, respectively; and W is the brightness signal resulting from adding the three camera signals. These color control signals, when applied to a receiver constructed in accordance with the present invention, accurately determine color for brightness signals at maximum or near-maximum values which the system is designed to accommodate whereas reduced saturation accompanies brightness signals of substantially lesser values. This is understandable from an inspection of Equations *a–c*. It will be observed that the magnitude of each of the color control signals $R_c$, $G_c$ and $B_c$ is related to the amplitude of the video signal W. As a result, the amount of electron beam deflection in a direction from the central reference position of a fluorescent cluster varies directly with the magnitude of the brightness signal. Thus, for a given hue, color saturation is lesser in picture areas of lower intensity than in the brighter areas.

It has been demonstrated that insofar as color perception of the human eye is concerned, extreme accuracy of color reproduction is necessary only in the portion or portions of a viewed scene having maximum brightness. Consequently, the color-dilution which accompanies a reduction in brightness signal amplitude may be immaterial and the receivers thus far described may be entirely suitable for the reproduction of useful images in natural color.

If, however, more accurate color information is required for lower levels of the brightness signal, the color control signals must be modified accordingly. To that end, the arrangement of Figure 4 effects modulation of the incoming control signals in such a manner that the modulated control signals are inversely proportional to the brightness signal thereby achieving precise color reproduction at any brightness level.

Figures 4, 5, 6:
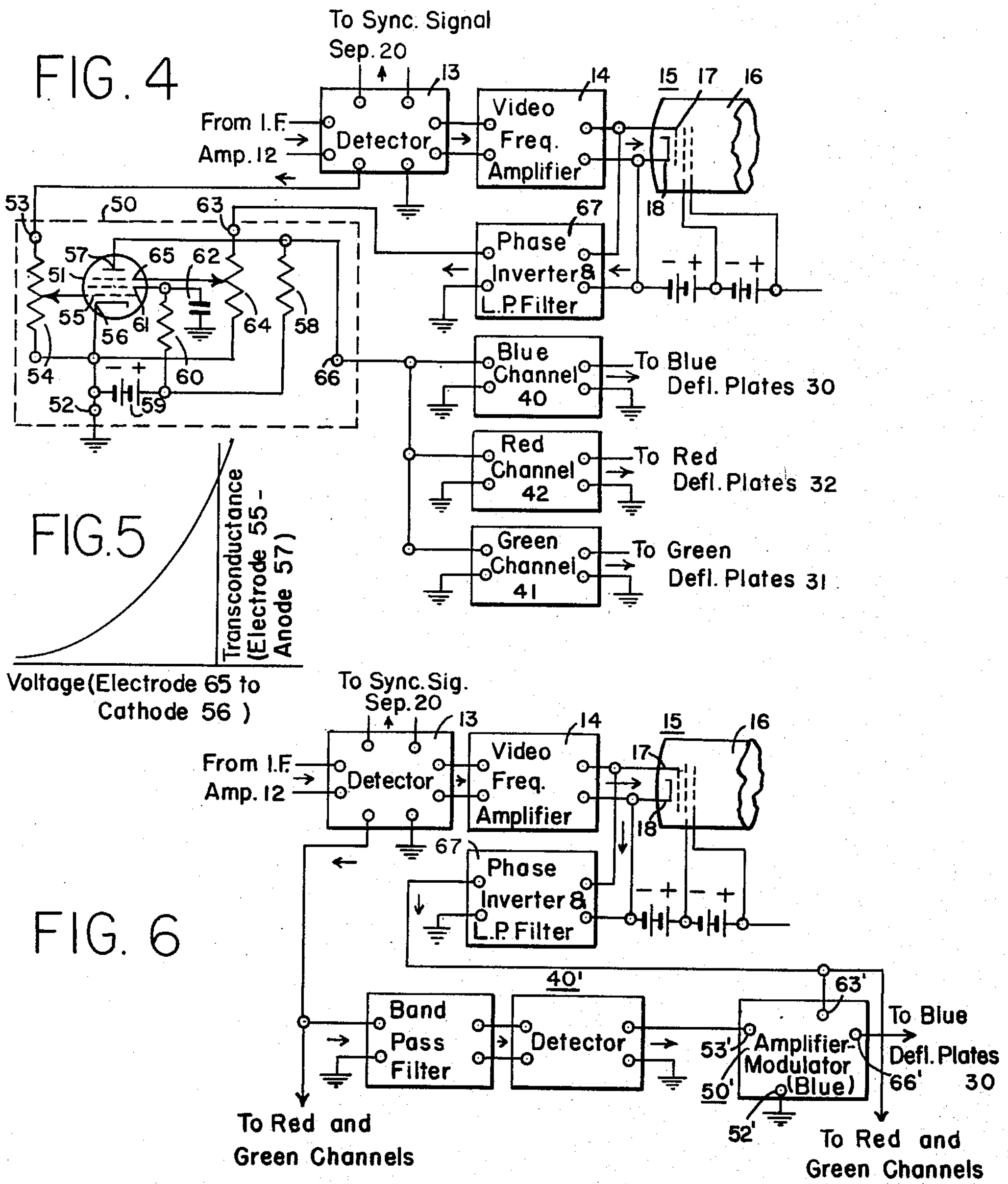
Figure 4 is a block diagram, partly schematic, of another modification of the receiver shown in Figure 1.
Figure 5 is a graph useful in explaining the operation of a portion of the circuit of Figure 4; and, Figure 6 is a block diagram, partly schematic, of still another modification of the receiver shown in Figure 1.

The circuit of Figure 4 represents a portion of the receiver shown in Figure 1, and identical elements are represented by the same reference numerals. A modulator 50 is interposed between detector 13 and the blue, green and red channels 40—42 and comprises an electron tube 51 of the pentode type. A ground connection at terminal 52 and a lead extending between terminal 53 of modulator 50 and detector 13 constitute a coupling circuit between these stages. One end of a potentiometer 54 is connected to terminal 53 and the other end is grounded. A control grid 55 of tube 51 is connected to the movable tap of potentiometer 54 and the cathode 56 of the tube is grounded. Its anode 57 is connected through a load resistor 58 to the positive terminal of a B-supply source 59, the negative terminal of which is grounded. The screen grid circuit of modulator 50 includes a screen resistor 60 connecting screen grid 61 with source 59 and a by-pass condenser 62 shunting to ground all signals within the video frequency range.

The output circuit of video frequency amplifier 14 is coupled to the input circuit of a phase inverter and low-pass filter 67. The frequency-response of unit 67 is such that only signal frequencies within the lower portion of the video frequency range are passed without attenuation whereas higher frequency components are attenuated; more specifically, it is expected that the received signal will contain color control components interleaved with video components in excess of one megacycle in frequency. Thus, stage 67 is arranged to pass signal frequencies up to one megacycle so that only video components are derived in its output circuit which is coupled to an input terminal 63 of stage 50 which, in turn, is grounded through a potentiometer 64, the movable tap of which is connected to the suppressor grid 65 of tube 51. The output signal of stage 50 is derived across load resistor 58 and it appears at an output terminal 66 which is coupled to the input circuits of channels 40—42.

The circuit parameters of stage 50 are arranged in known fashion to provide a control grid-to-plate transconductance that is inversely proportional to the modulating potential applied between suppressor grid 65 and cathode 56. This type of characteristic is illustrated by the curve of Figure 5 which is a plot of control grid-plate transconductance vs. suppressor grid-to-cathode voltage.

The operation of a color receiver incorporating the modified circuit of Figure 4 is generally similar to that described in connection with Figure 1. However, instead of signals being applied directly from detector 13 to the blue, green and red channels 40—42, the output signal of the detector is applied between control electrode 55 and cathode 56 of electron tube 51. At the same time, the video output or brightness signal from amplifier 14 is inverted in phase and filtered to remove color information by unit 67. The resulting signal is applied between suppressor grid 65 and cathode 56. By properly adjusting potentiometer controls 54 and 64, the output signal from stage 50 contains modified color control signals individually equal to the quotient of the received color control signals and one-third the brightness signal. In other words, the resulting control signals derived from modulator 50 and designated $R_m$, $G_m$ and $B_m$ may be defined as follows:

$$R_m=R_c\div\frac{W}{3} \qquad (d)$$

$$G_m=G_c\div\frac{W}{3} \qquad (e)$$

$$B_m=B_c\div\frac{W}{3} \qquad (f)$$

Accordingly, color variations in the reproduced image otherwise resulting from changes in level of the received brightness signal are compensated and accurate color reproduction is achieved irrespective of the magnitude of the brightness.

As an alternative to the foregoing arrangement wherein the color control signals are modified simultaneously, it is possible to modify these signals individually, after their separation from one another. This may be accomplished with the circuit arrangement of Figure 6 in conjunction with the receiver of Figure 1. As in the embodiment of Figure 1, three color channels of essentially identical construction are employed but, for convenience, only the blue channel 40' has been illustrated. It is coupled to an output circuit of detector 13 and includes a band pass filter and a detector connected in cascade with an amplifier-modulator 50' which may be identical to stage 50 of Figure 4. A phase inverter and low-pass filter 67, like the one of Figure 4, is coupled between video amplifier 14 and the modulating signal input terminal of modulator 50'. The output signal from modulator 50' is applied to the blue deflection plates 30 of Figure 1. It is evident that the color control signals, as translated by their individual color channels are modified by the video or brightness signal and are finally presented as signals of the type defined by Equations *d–f*.

It will be understood that the invention may be advantageously employed in any color television system wherein brightness information and color information are separately available at the receiver.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A television receiver for synthesizing an image in natural color in response to a video signal representing brightness information derived by combining three primary color signals and in response to a plurality of control signals, collectively defining hue and color saturation and individually representing the amplitude difference between one of said primary color signals and a portion of said video signal, said receiver comprising: an image-reproducing device including a single electron gun for developing a single beam of electrons and a fluorescent screen target having a multiplicity of triangularly shaped clusters of three fluorescent elements individually emitting light of one of the primary colors in response to electron bombardment; a deflection system for controlling the position of said beam with respect to said target; means for applying sweep signals to said deflection system to effect scanning of said target by said beam; means for continuously applying said brightness signal to said electron gun to modulate said beam as it scans said target; means for modifying the amplitude of said control signals inversely with respect to amplitude variations of said video signal to derive modified control signals; and means for concurrently applying said modified control signals to said deflection system to establish a resultant deflecting field for effecting angular and radial displacement of said beam relative to the central portion of each of said clusters to determine the color contribution of each such cluster to an image in natural color.

2. A television receiver for synthesizing an image in natural color in response to a video signal representing brightness information derived by combining three primary color signals and in response to a plurality of control signals, collectively defining hue and color saturation and individually representing the amplitude difference between one of said primary color signals and a portion of said video signal, said receiver comprising: an image-reproducing device including a single electron gun for developing a single beam of electrons and a fluorescent screen target having a multiplicity of triangularly shaped clusters of three fluorescent elements individually emitting light of one of the primary colors in response to electron bombardment; a deflection system for controlling the position of said beam with respect to said target; means for applying sweep signals to said deflection system to effect scanning of said target by said beam; means for continuously applying said brightness signal to said electron gun to modulate said beam as it scans said target; a modulator for deriving the arithmetical quotient of the amplitude values of a pair of signals; means for applying said control signals and at least a portion of the amplitude of said brightness signal to said modulator simultaneously to derive modified control signals having respective amplitudes inversely proportional to that of said brightness signal; and means for concurrently applying said modified control signals to said deflection system to establish a resultant deflecting field for effecting angular and radial displacement of said beam relative to the central portion of each of said clusters to determine the color contribution of each such cluster to an image in natural color.

3. A television receiver for synthesizing an image in natural color in response to a video signal representing brightness information derived by combining three primary color signals and in response to a plurality of color signals, collectively defining hue and color saturation and individually representing the amplitude difference between one of said primary color signals and a portion of said video signal, said receiver comprising: an image-reproducing device including a single electron gun for developing a single beam of electrons and a fluorescent screen target having a multiplicity of triangularly shaped clusters of three fluorescent elements individually emitting light of one of the primary colors in response to electron bombardment; a deflection system for controlling the position of said beam with respect to said target; means for applying sweep signals to said deflection system to effect scanning of said target by said beam; means for continuously applying said brightness signal to said electrode gun to modulate said beam as it scans said target; a plurality of modulators for individually deriving the arithmetical quotient of the amplitude values of a pair of applied signals; means for applying said control signals to respective ones of said modulators and for concurrently applying at least a portion of the amplitude of said brightness signal to said modulators to derive modified control signals having respective amplitudes inversely proportional to that of said brightness signal; and means for concurrently applying said modified control signals to said deflection system to establish a resultant deflecting field for effecting angular and radial displacement of said beam relative to the central portion of each of said clusters to determine the color contribution of each such cluster to an image in natural color.

References Cited in the file of this patent

UNITED STATES PATENTS

| | | |
|---|---|---|
| Re. 23,964 | Jenny | Mar. 22, 1955 |
| 2,492,926 | Valensi | Dec. 27, 1949 |
| 2,509,038 | Goldsmith | May 23, 1950 |
| 2,586,482 | Rose | Feb. 19, 1952 |
| 2,635,140 | Dome | Apr. 14, 1953 |
| 2,646,462 | Sziklai | July 21, 1953 |
| 2,710,890 | Skellett | June 14, 1955 |

FOREIGN PATENTS

| | | |
|---|---|---|
| 698,104 | Great Britain | Oct. 7, 1953 |

OTHER REFERENCES

Television, volume VI, "Tri-Color Kinescope Receivers," pages 338–342, published by RCA Review.